(12) United States Patent
Mihara et al.

(10) Patent No.: US 10,710,407 B2
(45) Date of Patent: *Jul. 14, 2020

(54) RUBBER COMPOSITION FOR TIRE AND PNEUMATIC TIRE

(71) Applicant: THE YOKOHAMA RUBBER CO., LTD., Minato-ku, Tokyo (JP)

(72) Inventors: Satoshi Mihara, Hiratsuka (JP); Kazushi Kimura, Hiratsuka (JP); Hirokazu Kageyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 271 days.

This patent is subject to a terminal disclaimer.

(21) Appl. No.: 15/744,940

(22) PCT Filed: Jul. 22, 2016

(86) PCT No.: PCT/JP2016/071612
§ 371 (c)(1),
(2) Date: Jan. 15, 2018

(87) PCT Pub. No.: WO2017/018355
PCT Pub. Date: Feb. 2, 2017

(65) Prior Publication Data
US 2018/0207984 A1 Jul. 26, 2018

(30) Foreign Application Priority Data
Jul. 24, 2015 (JP) .................... 2015-147045

(51) Int. Cl.
| | |
|---|---|
| B60C 1/00 | (2006.01) |
| C08L 9/00 | (2006.01) |
| C08L 9/06 | (2006.01) |
| C08L 101/02 | (2006.01) |
| C08F 2/22 | (2006.01) |
| C08F 236/06 | (2006.01) |
| C08K 5/37 | (2006.01) |

(52) U.S. Cl.
CPC .............. B60C 1/0016 (2013.01); B60C 1/00 (2013.01); C08F 2/22 (2013.01); C08F 236/06 (2013.01); C08K 5/37 (2013.01); C08L 9/00 (2013.01); C08L 9/06 (2013.01); C08L 101/02 (2013.01); *C08F 2810/20* (2013.01); *C08L 2205/22* (2013.01)

(58) Field of Classification Search
CPC .............................. C08L 9/00; C08L 2205/22
See application file for complete search history.

(56) References Cited

U.S. PATENT DOCUMENTS 9,982,116 B2 * 5/2018 Kimura .................... C08K 3/36
2013/0172443 A1 * 7/2013 Kushida .................... B60C 1/00
523/156

FOREIGN PATENT DOCUMENTS

| JP | 2010-090203 A | 4/2010 |
| JP | 2012-036268 A | 2/2012 |
| JP | 2012-211316 A | 11/2012 |
| JP | 2013-173816 A | 9/2013 |
| JP | 2013-224355 A | 10/2013 |
| JP | 2015-086307 A | 5/2015 |
| WO | 2016/148278 A1 | 9/2016 |

* cited by examiner

*Primary Examiner* — Vickey Nerangis
(74) *Attorney, Agent, or Firm* — Carrier Blackman & Associates, P.C.; Joseph P. Carrier; Anne G. Sabourin

(57) ABSTRACT

The present invention provides: a rubber composition for tires which has excellent processability and has excellent low heat build-up when formed into a tire; and a pneumatic tire using the same. The rubber composition for tires of the present invention is a rubber composition for tires, the rubber composition containing a diene rubber (A) and a microparticle (B), a vinyl group content of the diene rubber (A) being from 5 to 35 mass %, the microparticle (B) being a mercapto group-containing organic microparticle in which a crosslinkable oligomer or polymer (b1) is crosslinked, an average particle size of the microparticle (B) being from 1 to 200 μm, and a content of the microparticle (B) being from 1 to 55 parts by mass per 100 parts by mass of the diene rubber (A).

17 Claims, 1 Drawing Sheet

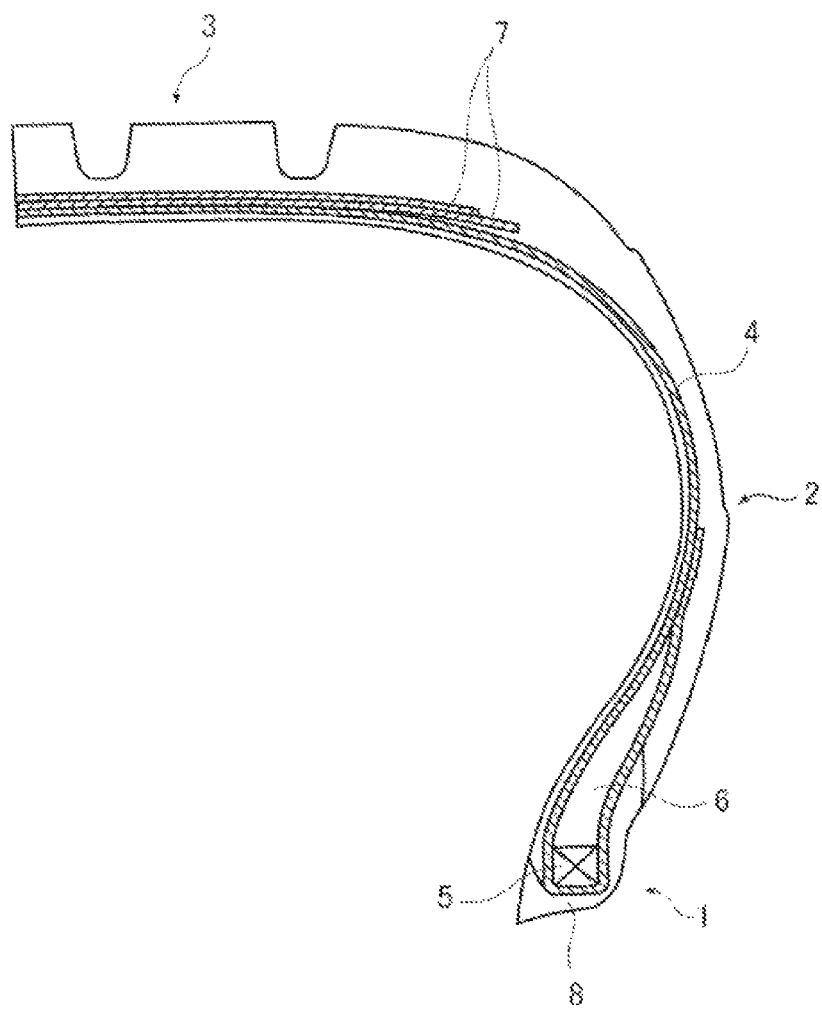

RUBBER COMPOSITION FOR TIRE AND PNEUMATIC TIRE

TECHNICAL FIELD

The present invention relates to a rubber composition for tires, and a pneumatic tire.

BACKGROUND ART

In recent years, low heat build-up of tires for automobiles has been highly demanded from the perspective of enhancing the fuel economy of such automobiles.

In response to such demands for low heat build-up, it has been known that use of a polymer with small hysteresis loss (e.g. natural rubber, and high-cis butadiene rubber) as a rubber composition for tire treads is effective to achieve low heat build-up (reduce rolling resistance).

On the other hand, it has been also known that a problem exist in that processability is poor when a polymer with small hysteresis loss is used.

Regarding such required characteristics and problems, for example, Patent Document 1 describes "a conjugated diene rubber composition containing a conjugated diene rubber (A) which is obtained by emulsion polymerization and which has a compounded proportion of an aromatic vinyl monomer unit of 30 to 50 wt. %, and a modified conjugated diene rubber (B) which is obtained by solution polymerization and which has a hydroxy group, a compounded ratio of the conjugated diene rubber (A) to the modified conjugated diene rubber (B) being from 55:45 to 85:15 in terms of weight ratio of "conjugated diene rubber (A):modified conjugated diene rubber (B)"" (Claim 1) and also describes a tire containing a crosslinked product of this rubber composition (Claims 4 and 5).

CITATION LIST

Patent Literature

Patent Document 1: JP 2015-086307 A

SUMMARY OF INVENTION

Technical Problem

As a result of diligent research on the rubber composition described in Patent Document 1, the inventors of the present invention found that processability may be poor and low heat build-up may not be sufficiently achieved depending on the type of the conjugated diene rubber (A) which is obtained by emulsion polymerization and which has the compounded proportion of an aromatic vinyl monomer unit of 30 to 50 wt. %, and the compounded proportion of the modified conjugated diene rubber (B) which is obtained by solution polymerization.

Therefore, an object of the present invention is to provide a rubber composition for tires which has excellent processability and excellent low heat build-up when formed into a tire; and a pneumatic tire using the same.

Solution to Problem

As a result of diligent research to solve the problems described above, the inventors of the present invention found that excellent processability and excellent low heat build-up when a tire is formed can be achieved by compounding a particular organic microparticle in which a crosslinkable oligomer or polymer is crosslinked in a diene rubber having a predetermined vinyl bond content, and thus completed the present invention.

Specifically, the inventors discovered that the problem described above can be solved by the following features.

[1] A rubber composition for a tire, the rubber composition containing:

a diene rubber (A) and a microparticle (B);

a vinyl group content of the diene rubber (A) being from 5 to 35 mass %;

the microparticle (B) being a mercapto group-containing organic microparticle in which a crosslinkable oligomer or polymer (b1) is crosslinked;

an average particle size of the microparticle (B) being from 1 to 200 μm; and a content of the microparticle (B) being from 1 to 55 parts by mass per 100 parts by mass of the diene rubber (A).

[2] The rubber composition for a tire according to [1], where the diene rubber (A) contains an aromatic vinyl-conjugated diene copolymer rubber (a); and a vinyl bond content of a conjugated diene in the aromatic vinyl-conjugated diene copolymer rubber (a) is from 10 to 50 mass %.

[3] The rubber composition for a tire according to [2], where the aromatic vinyl-conjugated diene copolymer rubber (a) is a styrene-butadiene copolymer rubber obtained by emulsion polymerization.

[4] The rubber composition for a tire according to any one of [1] to [3], where the crosslinkable oligomer or polymer (b1) is a polycarbonate urethane prepolymer.

[5] The rubber composition for a tire according to any one of [1] to [4], where the microparticle (B) is a microparticle to which a mercapto group is introduced after the crosslinkable oligomer or polymer (b1) is crosslinked in water, an organic solvent, or the diene rubber (A) and formed into a microparticle shape.

[6] A pneumatic tire including the rubber composition for a tire described in any one of [1] to [5] in a tire tread.

Advantageous Effects of Invention

As described below, according to the present invention, a rubber composition for tires which has excellent processability and has excellent low heat build-up when formed into a tire; and a pneumatic tire using the same can be provided.

BRIEF DESCRIPTION OF DRAWING

FIG. 1 is a schematic partial cross-sectional view of a tire that illustrates an embodiment of the pneumatic tire of the present invention.

DESCRIPTION OF EMBODIMENTS

Rubber Composition for Tire

The rubber composition for tires of the present invention contains a diene rubber (A) and a microparticle (B).

Furthermore, in the rubber composition for tires of the present invention, the vinyl group content of the diene rubber (A) is from 5 to 35 mass %.

Furthermore, in the rubber composition for tires of the present invention, the microparticle (B) is a mercapto group-containing organic microparticle in which a crosslinkable oligomer or polymer (b1) is crosslinked, the average particle size of the microparticle (B) is from 1 to 200 μm, and the content of the microparticle (B) is from 1 to 55 parts by mass per 100 parts by mass of the diene rubber (A).

In the present invention, as described above, excellent processability of the rubber composition and excellent low heat build-up of the pneumatic tire are achieved by blending the microparticle (B) in the diene rubber (A).

Although the reason is not clear in detail, it is assumed to be as follows.

It is conceived that use of a predetermined amount of organic microparticle that has a mercapto group and that has a particular range of the average particle size appropriately proceeds the reaction between the vinyl group of the diene rubber and the mercapto group of the microparticle, and thus the organic microparticle, which is more flexible than fillers such as silica, functions as a crosslinking agent, thereby dispersing local strain as well as reinforcing matrix rubber.

The components contained in the rubber composition for tires of the present invention are described in detail below.

Diene Rubber (A)

The diene rubber (A) contained in the rubber composition for tires of the present invention is a diene rubber having the vinyl group content of 5 to 35 mass %.

Note that the vinyl group content of the diene rubber (A) refers to the proportion (mass %) of the repeating units having vinyl groups among all the repeating units in one type or two or more types of diene polymers constituting the diene rubber (A).

Furthermore, the vinyl group content of the diene rubber (A) is preferably from 5 to 25 mass %, and more preferably from 5 to 20 mass %.

The diene rubber (A) is not particularly limited as long as the vinyl group content of the entire diene rubber is from 5 to 35 mass %. Specific examples thereof include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), halogenatedbutyl rubber (Br-IIR, Cl-IIR), chloroprene rubber (CR), and the like.

Note that the natural rubber can be used together with butadiene rubber or the like because most of the bonding forms are cis-1,4-bonds.

Aromatic Vinyl-Conjugated Diene Copolymer Rubber (a)

In the present invention, from the perspective of making the wet grip performance of the resulting tire excellent, the diene rubber (A) preferably contains at least an aromatic vinyl-conjugated diene copolymer rubber (hereinafter, also referred to as "aromatic vinyl-conjugated diene copolymer rubber (a)").

Furthermore, in the present invention, from the perspective of making the wet grip performance of the resulting tire excellent, the vinyl bond content of the conjugated diene in the aromatic vinyl-conjugated diene copolymer rubber (a) is preferably from 10 to 50 mass %, more preferably from 15 to 45 mass %, even more preferably from 15 to 30 mass %, and particularly preferably from 15 to 25 mass %.

Note that "vinyl bond content of the conjugated diene" refers to the proportion of 1,2-vinyl bonds among cis-1,4-bonds, trans-1,4-bonds, and 1,2-vinyl bonds (in the case of polyisoprene or chloroprene rubber, also includes 3,4-vinyl bonds; the same applies hereinafter) which are bonding forms of conjugated dienes, but not among all the repeating units of the aromatic vinyl-conjugated diene copolymer rubber (a).

Because of similar reasons, the aromatic vinyl content (e.g. styrene content) in the aromatic vinyl-conjugated diene copolymer rubber (a) is preferably from 15 to 50 mass %.

Furthermore, in the present invention, the content of the aromatic vinyl-conjugated diene copolymer rubber (a) in the diene rubber (A) is not particularly limited but is preferably 50 mass % or greater, more preferably from 80 to 100 mass %, and even more preferably 100 mass %. Note that the content of the aromatic vinyl-conjugated diene copolymer rubber (a) of 100 mass % indicates that only the aromatic vinyl-conjugated diene copolymer rubber (a) is used as the diene rubber (A).

Specific examples of the aromatic vinyl-conjugated diene copolymer rubber (a) include styrene-butadiene copolymer rubbers (SBR), styrene-isoprene copolymer rubbers, and the like.

Among these, SBR is preferable, and from the perspective of achieving even better processability, SBR obtained by emulsion polymerization is more preferable.

From the perspective of achieving excellent rigidity and wear resistance of the resulting tire, the weight average molecular weight of the aromatic vinyl-conjugated diene copolymer rubber (a) is preferably from 100000 to 1500000, more preferably from 300000 to 1500000, and even more preferably from 500000 to 1200000.

Note that the weight average molecular weight (Mw) is determined by gel permeation chromatography (GPC) based on calibration with polystyrene standards using tetrahydrofuran as a solvent.

In the present invention, from the perspective of achieving excellent wet grip performance of the resulting tire, the glass transition temperature of the aromatic vinyl-conjugated diene copolymer rubber (a) is preferably −35° C. or higher, more preferably from −35 to 0° C., and even more preferably from −30 to 5° C.

Note that the glass transition temperature is measured using a differential scanning calorimeter (DSC) at a rate of temperature increase of 20° C./min and calculated by the midpoint method.

The method of producing the aromatic vinyl-conjugated diene copolymer rubber (a) is not particularly limited, and the aromatic vinyl-conjugated diene copolymer rubber (a) can be produced by a conventionally known method.

The aromatic vinyl monomer and the conjugated diene monomer used in the production of the aromatic vinyl-conjugated diene copolymer rubber (a) are not particularly limited.

Examples of the aromatic vinyl monomer include styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine, and the like.

Examples of the conjugated diene monomer include 1,3-butadiene, isoprene (2-methyl-1,3-butadiene), 2,3-dimethyl-1,3-butadiene, 2-chloro-1,3-butadiene, 1,3-pentadiene, and the like.

Microparticle (B)

The microparticle (B) contained in the rubber composition for tires of the present invention is a mercapto group-containing organic microparticle in which a crosslinkable oligomer or polymer (b1) is crosslinked.

Furthermore, the average particle size of the microparticles (B) is from 1 to 200 µm, preferably from 2 to 50 µm, and more preferably from 5 to 30 µm.

Note that the "average particle size" of the microparticles (B) refers to the value obtained by measuring the maximum lengths of any 10 or more particles of the microparticles (B) that are observed by image analysis of the cross section of a vulcanized test sample of a rubber composition for tires performed using an electron microscope (magnification: approximately ×500 to ×2000) and averaging the obtained maximum lengths.

Crosslinkable Oligomer or Polymer (b1)

The crosslinkable oligomer or polymer (b1) constituting the microparticle (B) is not particularly limited as long as the crosslinkable oligomer or polymer (b1) is an oligomer or polymer having a crosslinkable functional group. Examples thereof include a polyether-based, polyester-based, polyolefin-based, polycarbonate-based, aliphatic-based, saturated hydrocarbon-based, acrylic-based, plant-derived, or siloxane-based polymer or copolymer described above, and the like.

Among these, for example, from the perspective of being capable of producing a tough urethane rubber, polyether-based and polycarbonate-based copolymers are preferable, and polycarbonate-based copolymers are more preferable.

Examples of the polycarbonate-based copolymer include substances obtained via transesterification reaction of dialkyl carbonate and a polyol compound (e.g. 1,6-hexane diol, 1,4-butane diol, and 1,5-pentane diol); substances obtained via condensation reaction of polycarbonate diol and a diisocyanate compound (e.g. 2,4-tolylene diisocyanate, 2,6-tolylene diisocyanate, 4,4'-diphenylmethane diisocyanate, and 2,4'-diphenylmethane diisocyanate) (hereinafter, also abbreviated as "polycarbonate urethane prepolymer"); and the like.

Among these, from the perspective of enhancing the strength of the microparticle, a polycarbonate urethane prepolymer is preferable.

On the other hand, specific examples of the crosslinkable functional group contained in the crosslinkable oligomer or polymer (b1) include a hydroxy group, a hydrolyzable silyl group, a silanol group, an isocyanate group, a (meth) acryloyl group, an allyl group, a carboxy group, an acid anhydride group, an epoxy group, and the like.

Among these, from the perspective of making the wear resistance of the produced pneumatic tire even better, an isocyanate group is preferably contained.

Note that, in the present specification, "(meth)acryloyloxy group" refers to an acryloyloxy group ($CH_2$=CHCOO—) or a methacryloyloxy group ($CH_2$=C($CH_3$)COO—).

In the present invention, as described above, the microparticle (B) contains a mercapto group.

Note that the mercapto group is preferably present on the surface of the microparticle (B) through covalent bonding.

Furthermore, in the present invention, from the perspective of facilitating adjustment of particle size and introduction of the mercapto group, the microparticle (B) is a microparticle into which a mercapto group is introduced after the crosslinkable oligomer or polymer (b1) is crosslinked in water, an organic solvent, or the diene rubber (A) and formed into a microparticle shape.

Note that an example of the method for introducing a mercapto group is, as described in synthesis examples in the Examples described below, a method in which an isocyanate group-containing urethane prepolymer is synthesized by adding a diisocyanate compound to a hydroxy group-containing oligomer, such as polytetramethylene ether glycol, polycarbonate diol, hydroxy group-containing polyisoprene, and hydroxy group-containing polybutadiene, then the urethane prepolymer is reacted with a compound having a (meth)acryloyloxy group and a hydroxy group (e.g. hydroxy acrylate, hydroxy methacrylate, and the like), and then a polyfunctional thiol compound is addition reacted with the (meth)acryloyloxy group contained in the synthesized product after the reaction via thiol-ene reaction to introduce the mercapto group.

Furthermore, another example of the method is a method in which a hydroxy group-containing oligomer, such as polytetramethylene ether glycol, polycarbonate diol, hydroxy group-containing polyisoprene, and hydroxy group-containing polybutadiene, is reacted with a compound having a (meth)acryloyloxy group and a hydroxy group (e.g. 2-isocyanatoethyl methacrylate, and 2-isocyanatoethyl acrylate), and then a polyfunctional thiol compound is addition reacted via thiol-ene reaction to introduce the mercapto group.

Furthermore, another example of the method is a method in which an isocyanate silane or the like is added to a hydroxy group-containing oligomer, such as polytetramethylene ether glycol, polycarbonate diol, hydroxy group-containing polyisoprene, and hydroxy group-containing polybutadiene, to introduce a hydrolyzable silyl group, and a sulfur-containing silane coupling agent, such as mercaptosilanes, sulfur silanes, and polysulfide silanes, is added simultaneously with the reaction via silanol condensation to perform crosslinking and the curing.

In the present invention, from the perspective of ease in forming a uniform shape, the microparticle (B) is preferably a microparticle obtained by micronizing the crosslinkable oligomer or polymer (b1) described above in a dispersion liquid using water or an organic solvent (e.g. MEK, MIBK, butyl cellosolve, and cyclohexanone) as a dispersion medium, and then removing the dispersion medium to form a powder.

Furthermore, the microparticle (B) is preferably prepared by using additives, such as a surfactant, an emulsifier, a dispersing agent, and a silane coupling agent, when the microparticles are formed in the dispersion liquid.

Furthermore, from the perspective of ease in forming a uniform shape, the elastic microparticle (B) is preferably obtained by making the crosslinkable oligomer or polymer (b1) described above into a microparticle in the diene rubber (A) described above.

In the present invention, the content of the microparticle (B) is from 1 to 55 parts by mass per 100 parts by mass of the diene rubber (A). From the perspective of cost or the like, the content of the microparticle (B) is preferably 50 parts by mass or less, more preferably from 5 to 40 parts by mass, and even more preferably from 10 to 40 parts by mass.

Carbon Black and/or White Filler (C)

The rubber composition for tires of the present invention preferably contains a carbon black and/or a white filler (C).

Carbon Black

Specific examples of the carbon black include furnace carbon blacks such as SAF, ISAF, HAF, FEF, GPE, and SRF, and one of these can be used alone, or two or more types can be used in combination.

Furthermore, the carbon black preferably has a nitrogen adsorption specific surface area ($N_2SA$) of 10 to 300 $m^2/g$, and more preferably 20 to 200 $m^2/g$, from the perspective of processability when the rubber composition is mixed, reinforcing property of the pneumatic tire, and the like.

Note that the $N_2SA$ is the value of the amount of nitrogen adsorbed to the surface of carbon black, measured in accordance with JIS K6217-2:2001, "Part 2: Determination of specific surface area—Nitrogen adsorption methods—Single-point procedures".

White Filler

Specific examples of the white filler are silica, calcium carbonate, magnesium carbonate, talc, clay, alumina, aluminum hydroxide, titanium oxide, calcium sulfate, and the like. One type of these can be used alone, or a combination of two or more types of these can be used.

Among these, from the perspective of reinforcing property, silica is preferable.

Specific examples of the silica include wet silica (hydrous silicic acid), dry silica (silicic anhydride), calcium silicate, aluminum silicate, and the like. One type of these can be used alone, or a combination of two or more types of these can be used.

Among these, from the perspective of balance of rolling resistance, grip performance, wear resistance, and the like, wet silica is preferable.

From the perspective of kneadability, the silica preferably has a CTAB adsorption specific surface area of 50 to 300 $m^2/g$.

Note that the CTAB adsorption specific surface area is the value of the amount of n-hexadecyltrimethylammonium bromide adsorbed to the surface of silica measured in accordance with JIS K6217-3:2001 "Part 3: Method for determining specific surface area—CTAB adsorption method."

In the present invention, from the perspectives of wet grip performance and wear resistance, when the carbon black and/or the white filler (C) are contained, the content is preferably from 40 to 130 parts by mass, more preferably from 50 to 100 parts by mass, and even more preferably 50 parts by mass or greater but less than 100 parts by mass, per 100 parts by mass of the diene rubber (A).

Furthermore, in the present invention, from the perspective of wet grip performance and rigidity, when the carbon black and/or the white filler (C) are contained, the content is preferably from 100 to 200 parts by mass, more preferably greater than 100 parts by mass but 200 parts by mass or less, and even more preferably from 110 to 180 parts by mass, per 100 parts by mass of the diene rubber (A).

Note that the content of the carbon black and/or the white filler (C) refers to the content of the carbon black in the case where only the carbon black is contained, or refers to the content of the white filler in the case where only the white filler is contained, or refers to the total content of the carbon black and the white filler in the case where the carbon black and the white filler are contained.

Silane Coupling Agent

When the rubber composition for tires of the present invention contains the white filler (especially silica) described above, the rubber composition preferably contains a silane coupling agent because the silane coupling agent improves the reinforcing performance of the tire.

When the silane coupling agent is compounded, the content thereof is preferably from 0.1 to 20 parts by mass, and more preferably from 4 to 12 parts by mass, per 100 parts by mass of the white filler.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Among these, from the perspective of enhancing effect of reinforcing property, use of bis-(3-triethoxysilylpropyl)tetrasulfide and/or bis-(3-triethoxysilylpropyl)disulfide is preferable. Specific examples thereof include Si69 (bis(3-triethoxysilylpropyl)tetrasulfide, available from Evonik Degussa), Si75 (bis(3-triethoxysilylpropyl)disulfide, available from Evonik Degussa), and the like.

Other Components

Besides the components described above, the rubber composition for tires of the present invention may further contain various other additives typically used in rubber compositions for tires. Examples of the additives include fillers, such as calcium carbonate; chemical foaming agents, such as dinitrosopentamethylenetetramine (DPT), azodicarbon amide (ADCA), dinitroso pentastyrene tetramine, oxybisbenzenesulfonyl hydrazide (OBSH), benzenesulfonyl hydrazide derivatives, ammonium bicarbonate that generates carbon dioxide, ammonium carbonate, sodium bicarbonate, toluenesulfonyl hydrazide that generates nitrogen, p-toluenesulfonyl semicarbazide, nitrososulfonylazo compounds, N,N'-dimethyl-N,N'-dinitroso phthalamide, and p,p'-oxy-bis(benzenesulfonyl semicarbazide); vulcanizing agents, such as sulfur; sulfenamide-based, guanidine-based, thiazole-based, thiourea-based, and thiuram-based vulcanization accelerators; vulcanization accelerator aids, such as zinc oxide and stearic acid; waxes; aroma oils; anti-aging agents; plasticizers; and the like.

The compounded amount of these additives may be any conventional amount, as long as the object of the present invention is not impaired. For example, from 0.5 to 5 parts by mass of sulfur, from 0.1 to 5 parts by mass of a vulcanization accelerator, from 0.1 to 10 parts by mass of a vulcanization accelerator aid, from 0.5 to 5 parts by mass of an anti-aging agent, from 1 to 10 parts by mass of wax, and from 5 to 30 parts by mass of aroma oil may be blended per 100 parts by mass of the diene rubber (A).

Method of Producing Rubber Composition for Tire

There are no particular restrictions to the method of producing the rubber composition for tires of the present invention, and an example is the method whereby the above-mentioned components are kneaded using a publicly known method and device (such as a Banbury mixer, kneader, or roll).

Furthermore, the rubber composition for tires of the present invention can be vulcanized or crosslinked under conventionally known vulcanizing or crosslinking conditions.

Pneumatic Tire

The pneumatic tire of the present invention is a pneumatic tire that uses the rubber composition for tires of the present invention described above in the tire treads.

FIG. 1 is a schematic partial cross-sectional view of a tire that illustrates an embodiment of the pneumatic tire of the present invention, but the tire of the present invention is not limited to the embodiment illustrated in FIG. 1.

In FIG. 1, reference sign 1 denotes a bead portion, reference sign 2 denotes a sidewall portion, and reference sign 3 denotes a tread portion formed from the rubber composition for tires according to an embodiment of the present invention.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The pneumatic tire according to an embodiment of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Preparation of Microparticle 1

A polycarbonate urethane prepolymer having terminals capped with isocyanates (reaction product 1) was obtained by reacting 200 g of polycarbonate diol (T6001, available from Asahi Kasei Corporation) and 100 g of 4,4'-diphenylmethane diisocyanate (Millionate MT, available from Nippon Polyurethane Industry Co., Ltd.) at 80° C. for 5 hours.

Furthermore, separately from the reaction product 1, a reaction product (reaction product 2) was obtained by mixing 20 g of trimethylolpropane (TMP, available from Mitsubishi Gas Chemical Company, Inc.), 20 g of methyl isobutyl ketone (hereinafter, abbreviated as "MIBK"), and 23 g of 2-isocyanatoethyl methacrylate (Karenz MOI (trade name), available from Showa Denko K.K.) and then reacted at 80° C. for 10 hours.

Thereafter, in 50 g of the urethane prepolymer (reaction product 1), 5 g of MIBK, 2.2 g of dimethylol butanoic acid (DMBA), 1.1 g of triethylamine (TEA), and 6.1 g of the reaction product 2 were mixed and stirred for 10 minutes.

Thereafter, 80 g of water, 5.0 g of sorbitan acid-based surfactant (TW-0320V, available from Kao Corporation), 8.5 g of pentaerythritol tetrakis(3-mercaptobutyrate), and 0.06 g of dibutyltin dilaurate (DBTL) were placed in a high speed dissolver mixer and stirred at a rotational speed of 1000 rpm for 10 minutes. Thereafter, the temperature was gradually increased to 70° C., and the stirring was continued for 1 hour to obtain a milky-white emulsion solution.

When the obtained solution was applied on a glass plate and observed using a laser microscope after water had been vaporized, it was confirmed that spherical microparticles 1 were formed.

The average particle size of the obtained microparticles 1 was approximately 10 µm.

Examples 1 to 7 and Comparative Examples 1 to 4

The components shown in Table 1 below were blended at the proportions (parts by mass) shown in Table 1 below.

Specifically, a master batch was obtained by first kneading the components shown in Table 1 below, except the sulfur and the vulcanization accelerator, for 5 minutes in a 1.7-L sealed mixer, and then discharging the kneaded product when the temperature reached 150° C.

Next, a rubber composition was obtained by kneading the sulfur and the vulcanization accelerator with the obtained master batch using an open roll.

Processability (1) Ease in Forming Lump of Rubber

Ease in forming a lump of the master batch (rubber) during the discharging from the mixer was evaluated based on the following criteria. The results are shown in Table 1 below.

1: The rubber after the discharge was crumbling and was not formed into a lump, and a large amount of powder carbon black remained. Dispersion of the carbon black was obviously poor when visually observed.

2: The formability of a lump of the rubber was somewhat poor, and the powder carbon black remained.

3: The formability of a lump of the rubber was very good, but a slight amount of the powder carbon black was observed.

4: The formability of a lump of the rubber was excellent, and no powder carbon black was observed.

(Note: a larger value indicates superior processability)

(2) Viscosity

Mooney viscosity ($ML_{1+4}$ (100° C.)) was measured in accordance with JIS K6300-1:2001. The results are shown in Table 1 below.

M300/M100

A vulcanized rubber sheet was produced by vulcanizing the obtained rubber composition for 10 minutes at 170° C. in a mold for Lambourn abrasion (disk having a diameter of 63.5 mm and a thickness of 5 mm).

Dumbbell-shaped JIS No. 3 test pieces (thickness: 2 mm) were punched out from the vulcanized rubber sheet in accordance with JIS K6251:2010. The measurements of 300% modulus (stress during 300% deformation) and 100% modulus (stress during 100% deformation) were conducted at a temperature of 20° C. at a tensile test speed of 500 mm/minute.

Thereafter, the ratio (M300/M100) of the 300% modulus (M300) to 100% modulus (M100) was calculated and evaluated as an index value with the ratio of Comparative Example 1 expressed as an index value of 100. The results are shown in Table 1 below.

tan δ (60° C.)

For the vulcanized rubber sheet produced as described above, tan δ (60° C.) was measured using a viscoelastic spectrometer (available from Iwamoto Seisakusho Co. Ltd.) in accordance with JIS K6394:2007 under the following conditions: a strain of tensile deformation of 10%±2%; a frequency of 20 Hz; and a temperature of 60° C.

The results are shown in Table 1. The results were expressed as index values with the tan δ (60° C.) of Comparative Example 1 expressed as an index value of 100. A smaller index value indicates a greater tan δ (60° C.), which indicates a superior low heat build-up when a tire is formed.

TABLE 1

| Table 1 | Comparative Examples | | | | Examples | | | | | | |
|---|---|---|---|---|---|---|---|---|---|---|---|
| | 1 | 2 | 3 | 4 | 1 | 2 | 3 | 4 | 5 | 6 | 7 |
| SBR 1 | 137.5 | — | 137.5 | — | 137.5 | 137.5 | 137.5 | 110 | — | 55 | 96.25 |
| SBR 2 | — | — | — | 68.75 | — | — | — | — | 137.5 | — | — |
| SBR 3 | — | 137.5 | — | 68.75 | — | — | — | 27.5 | — | 82.5 | 41.25 |
| Silica | 90 | 80 | 90 | 70 | 80 | 70 | 60 | 60 | 70 | 60 | 70 |
| Microparticle 1 | — | 10 | 0.5 | 20 | 10 | 20 | 30 | 20 | 20 | 20 | 55 |
| Zinc oxide | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Anti-aging agent | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 |
| Vulcanization accelerator 1 | 2 | 2 | 2 | 2 | 2 | 2 | 2 | 2 | 2 | 2 | 2 |
| Vulcanization accelerator 2 | 0.5 | 0.5 | 0.5 | 0.5 | 0.5 | 0.5 | 0.5 | 0.5 | 0.5 | 0.5 | 0.5 |
| Vinyl group content (mass %) | 8 | 50 | 8 | 39 | 8 | 8 | 8 | 17 | 27 | 34 | 21 |
| Ease in forming lump of rubber | 4 | 1 | 4 | 2 | 4 | 4 | 3 | 4 | 3 | 3 | 3 |
| Viscosity | 100 | 110 | 100 | 105 | 98 | 95 | 95 | 90 | 102 | 100 | 103 |
| M300/M100 | 100 | 142 | 120 | 130 | 104 | 107 | 110 | 116 | 113 | 119 | 122 |
| tan δ (60° C.) | 100 | 110 | 100 | 82 | 90 | 96 | 71 | 75 | 82 | 87 | 75 |

The components shown in Table 1 are as follows.

SBR 1: Nipol 1739 (oil extended product (37.5 parts by mass of extender oil was contained per 100 parts by mass of SBR; net amount of SBR in the SBR: 72.7 mass %); styrene content: 40 mass %; vinyl bond content: 13.7 mass %; glass transition temperature: −31° C.; weight average molecular weight: 760000; available from ZEON Corporation)

Note that Example 1 containing 137.5 parts by mass of SBR 1 had the net rubber content (SBR), which excluded the content of the extender oil, of 100 parts by mass. Furthermore, because the vinyl group content in this SBR was the vinyl bond content (13.7 mass %) of the 60 mass % which was obtained by excluding the mass of the styrene unit (40 mass %), the calculated vinyl group content is approximately 8% which is obtained by multiplying 60% and 13.7% and 100.

SBR 2: E581 (oil extended product (37.5 parts by mass of extender oil was contained per 100 parts by mass of SBR; net amount of SBR in the SBR: 72.7 mass %); styrene content: 37 mass %; vinyl bond content: 42.5 mass %; weight average molecular weight: 126000; available from Asahi Kasei Corporation)

Note that Example 5 containing 137.5 parts by mass of SBR 2 had the net rubber content (SBR), which excluded the content of the extender oil, of 100 parts by mass. Furthermore, because the vinyl group content in this SBR was the vinyl bond content (42.5 mass %) of the 63 mass % which was obtained by excluding the mass of the styrene unit (37 mass %), the calculated vinyl group content is approximately 27% which is obtained by multiplying 63% and 42.5% and 100.

SBR 3: NS460 (oil extended product (37.5 parts by mass of extender oil was contained per 100 parts by mass of SBR; net amount of SBR in the SBR: 72.7 mass %); styrene content: 27 mass %; vinyl bond content: 68.8 mass %; weight average molecular weight: 120000; available from ZEON Corporation)

Note that Comparative Example 2 containing 137.5 parts by mass of SBR 2 had the net rubber content (SBR), which excluded the content of the extender oil, of 100 parts by mass. Furthermore, because the vinyl group content in this SBR was the vinyl bond content (68.8 mass %) of the 73 mass % which was obtained by excluding the mass of the styrene unit (27 mass %), the calculated vinyl group content is approximately 50% which is obtained by multiplying 73% and 68.8% and 100.

Silica: Zeosil 1165MP (CTAB specific surface area: 159 m$^2$/g; available from Rhodia)

Microparticle 1: microparticle produced as described above

Zinc oxide: Zinc Oxide III (available from Seido Chemical Industry Co., Ltd.)

Stearic acid: Beads stearic acid YR (available from NOF Corporation)

Anti-aging agent: Amine-based anti-aging agent (Santflex 6PPD, available from Flexsys)

Sulfur: "Golden Flower" oil-treated sulfur powder (available from Tsurumi Chemical Industry Co., Ltd.)

Vulcanization accelerator 1: vulcanization accelerator CBS (NOCCELER CZ-G, available from Ouchi Shinko Chemical Industrial Co., Ltd.)

Vulcanization accelerator 2: vulcanization accelerator DPG (NOCCELER D, available from Ouchi Shinko Chemical Industrial Co., Ltd.)

From the results shown in Table 1, it was found that the cases where the vinyl group content of the diene rubber was outside the range of 5 to 35 mass % exhibited poor processability even when the microparticle (B) was blended (Comparative Examples 2 and 4).

Furthermore, it was found that the case where the compounded amount of the microparticle (B) was outside the range of 1 to 55 parts by mass exhibited insufficient low heat build-up even when the vinyl group content of the diene rubber (A) was in the range of 5 to 35 mass % (Comparative Example 3).

On the other hand, it was found that all the cases where the diene rubber (A) having the vinyl group content in the range of 5 to 35 mass % was used and the predetermined amount of the microparticle (B) was blended exhibited excellent processability and excellent low heat build-up.

REFERENCE SIGNS LIST

1 Bead portion
2 Sidewall portion
3 Tire tread portion
4 Carcass layer
5 Bead core
6 Bead filler 7 Belt layer
8 Rim cushion

The invention claimed is:

1. A rubber composition for a tire, the rubber composition comprising:
    a diene rubber (A) and a microparticle (B);
    a vinyl group content of the diene rubber (A) being from 5 to 35 mass %;
    the microparticle (B) being a mercapto group-containing organic microparticle in which a crosslinkable oligomer or polymer (b1) is crosslinked;
    an average particle size of the microparticle (B) being from 1 to 200 μm; and
    a content of the microparticle (B) being from 1 to 55 parts by mass per 100 parts by mass of the diene rubber (A).

2. The rubber composition for a tire according to claim 1, wherein the diene rubber (A) contains an aromatic vinyl-conjugated diene copolymer rubber (a); and
    a vinyl bond content of a conjugated diene in the aromatic vinyl-conjugated diene copolymer rubber (a) is from 10 to 50 mass %.

3. The rubber composition for a tire according to claim 2, wherein the aromatic vinyl-conjugated diene copolymer rubber (a) is a styrene-butadiene copolymer rubber obtained by emulsion polymerization.

4. The rubber composition for a tire according to claim 3, wherein the crosslinkable oligomer or polymer (b1) is a polycarbonate urethane prepolymer.

5. The rubber composition for a tire according to claim 4, wherein the microparticle (B) is a microparticle to which a mercapto group is introduced after the crosslinkable oligomer or polymer (b1) is crosslinked in water, an organic solvent, or the diene rubber (A) and formed into a microparticle shape.

6. The rubber composition for a tire according to claim 3, wherein the microparticle (B) is a microparticle to which a mercapto group is introduced after the crosslinkable oligomer or polymer (b1) is crosslinked in water, an organic solvent, or the diene rubber (A) and formed into a microparticle shape.

7. The rubber composition for a tire according to claim 2, wherein the crosslinkable oligomer or polymer (b1) is a polycarbonate urethane prepolymer.

8. The rubber composition for a tire according to claim 7, wherein the microparticle (B) is a microparticle to which a mercapto group is introduced after the crosslinkable oligomer or polymer (b1) is crosslinked in water, an organic solvent, or the diene rubber (A) and formed into a microparticle shape.

9. The rubber composition for a tire according to claim 2, wherein the microparticle (B) is a microparticle to which a mercapto group is introduced after the crosslinkable oligomer or polymer (b1) is crosslinked in water, an organic solvent, or the diene rubber (A) and formed into a microparticle shape.

10. The rubber composition for a tire according to claim 1, wherein the crosslinkable oligomer or polymer (b1) is a polycarbonate urethane prepolymer.

11. The rubber composition for a tire according to claim 10, wherein the microparticle (B) is a microparticle to which a mercapto group is introduced after the crosslinkable oligomer or polymer (b1) is crosslinked in water, an organic solvent, or the diene rubber (A) and formed into a microparticle shape.

12. The rubber composition for a tire according to claim 1, wherein the microparticle (B) is a microparticle to which a mercapto group is introduced after the crosslinkable oligomer or polymer (b1) is crosslinked in water, an organic solvent, or the diene rubber (A) and formed into a microparticle shape.

13. A pneumatic tire comprising the rubber composition for a tire described in claim 1 in a tire tread.

14. A pneumatic tire comprising the rubber composition for a tire described in claim 2 in a tire tread.

15. A pneumatic tire comprising the rubber composition for a tire described in claim 3 in a tire tread.

16. A pneumatic tire comprising the rubber composition for a tire described in claim 10 in a tire tread.

17. A pneumatic tire comprising the rubber composition for a tire described in claim 12 in a tire tread.

* * * * *